(12) United States Patent
Guo et al.

(10) Patent No.: US 11,229,840 B2
(45) Date of Patent: Jan. 25, 2022

(54) EQUIPMENT DISPLAY METHOD, APPARATUS, DEVICE AND STORAGE MEDIUM IN VIRTUAL ENVIRONMENT BATTLE

(71) Applicant: TENCENT TECHNOLOGY (SHENZHEN) COMPANY LIMITED, Guangdong (CN)

(72) Inventors: Zhao Xing Guo, Shenzhen (CN); Jian Wei Xiao, Shenzhen (CN); Yi Zhong Hu, Shenzhen (CN)

(73) Assignee: TENCENT TECHNOLOGY (SHENZHEN) COMPANY LTD, Shenzhen (CN)

(*) Notice: Subject to any disclaimer, the term of this patent is extended or adjusted under 35 U.S.C. 154(b) by 0 days.

(21) Appl. No.: 16/902,784

(22) Filed: Jun. 16, 2020

(65) Prior Publication Data

US 2020/0306633 A1 Oct. 1, 2020

Related U.S. Application Data

(63) Continuation of application No. PCT/CN2019/076347, filed on Feb. 27, 2019.

(30) Foreign Application Priority Data

Mar. 23, 2018 (CN) .......................... 201810247825.1

(51) Int. Cl.
*A63F 13/426* (2014.01)
*A63F 13/52* (2014.01)
(Continued)

(52) U.S. Cl.
CPC ............ *A63F 13/426* (2014.09); *A63F 13/52* (2014.09); *A63F 13/533* (2014.09); *A63F 13/55* (2014.09);
(Continued)

(58) Field of Classification Search
CPC ...... A63F 13/426; A63F 13/52; A63F 13/533; A63F 2300/308
See application file for complete search history.

(56) References Cited

U.S. PATENT DOCUMENTS

2014/0213356 A1    7/2014  Iwano et al.

FOREIGN PATENT DOCUMENTS

| CN | 103502917 A | 1/2014 |
| CN | 106730810 A | 5/2017 |

(Continued)

OTHER PUBLICATIONS

Suicide Squad: Special Ops video game by Tailspin, published Jul. 2016 (evidenced by screenshots from YouTube: https://www.youtube.com/watch?v=a5BkYwZMrOl) (Year: 2016).*

(Continued)

*Primary Examiner* — James S. McClellan
(74) *Attorney, Agent, or Firm* — Sughrue Mion, PLLC

(57) ABSTRACT

A method, an apparatus, a device, and a storage medium for displaying an equipment in a virtual environment battle. The method includes displaying a first battle interface of the virtual environment battle including a main equipment slot, an auxiliary equipment slot, and an expansion control interface in a first partial region of the first battle interface, the main equipment slot for displaying a main equipment of the virtual character, and the auxiliary equipment slot for displaying a first auxiliary equipment of the virtual character; receiving a first trigger signal on the expansion control interface, and displaying a second battle interface of the virtual environment battle including the main equipment slot, the auxiliary equipment slot, and an expansion equipment slot in a second partial region of the second battle interface, the expansion equipment slot for displaying a (Continued)

second auxiliary equipment owned by the virtual character other than the first auxiliary equipment.

18 Claims, 10 Drawing Sheets

(51) Int. Cl.
  *A63F 13/533* (2014.01)
  *A63F 13/55* (2014.01)
  *A63F 13/837* (2014.01)

(52) U.S. Cl.
  CPC ....... *A63F 13/837* (2014.09); *A63F 2300/308* (2013.01); *A63F 2300/6045* (2013.01); *A63F 2300/8076* (2013.01)

(56) References Cited

FOREIGN PATENT DOCUMENTS

| | | |
|---|---|---|
| CN | 107694085 A | 2/2018 |
| CN | 108434736 A | 8/2018 |
| JP | 2007-29222 A | 2/2007 |

OTHER PUBLICATIONS

Unskilled video game by Madfinger Games, published Sep. 2015 (evidenced by screenshots from YouTube: https://www.youtube.com/watch?v=GrT0dA-hl0s) (Year: 2015).*

Bai Da, "(Non-official translation: Jedi Survival Stimulates Battlefield Gun Change and Bullet Operation Teaching)", http://m.ququyou.com/jdgssy/42911.html, Feb. 9, 2018.
International Search Report for PCT/CN2019/076347 dated Apr. 29, 2019 [PCT/ISA/210].
Written Opinion for PCT/CN2019/076347 dated Apr. 29, 2019 [PCT/ISA/237].
Chinese Office Action for 201810247825.1 dated Oct. 9, 2019.
Chinese Office Action for 201810247825.1 dated Mar. 23, 2018.
Chinese Office Action for 201810247825.1 dated Jun. 28, 2019.
Chinese Office Action for 201810247825.1 dated Apr. 20, 2020.
Translation of the Written Opinion of the International Searching Authority dated Apr. 29, 2019 in International Application No. PCT/CN2019/076347.
Notice of Reasons for Refusal dated Oct. 12, 2021 by the Japanese Patent Office in Japanese Application No. 2020-543586.
"What is the difference between the smartphone versions of "PUBG", "Whole Army" and "Stimulation"? I tried to explore the charm of the two works", Famitsu App, 2018, Retrieved From: URL <https://app.famitsu.com/20180309_1250883> (11 pages total).
"Counter-Strike 1.6 Summary 2nd", Wayback Machine, Console List, 2016, Retrieved from: URL <Https://web.archive.org/web/20160326001122/https:/counterstrike.wiki.fc2.com/wiki/%E3%82%B3%E3%83%B3%E3%82%BD%E3%83%BC%E3%83%AB%E4%B8%80%E8%A6%A7> (4 pages total).
"How to get started with CSO (free FPS)", Emilia's Netoge Picture Diary, 2012, Retrieved From: URL <https://teenauo3.exblog.jp/12175111> (9 pages total).
"PUBG Mobile: Walkthrough Gameplay Part-1 PlayerUnknown's Battlegrounds (Android, iOS)", YouTube, 2018, Retrieved from: URL <https://www.youtube.com/watch?v=WQ2aGrwPls> (3 pages total).

* cited by examiner

EQUIPMENT DISPLAY METHOD, APPARATUS, DEVICE AND STORAGE MEDIUM IN VIRTUAL ENVIRONMENT BATTLE

CROSS-REFERENCE TO RELATED APPLICATION(S)

This application is a continuation of PCT/CN2019/076347 and claims priority to Chinese Patent Application No. 201810247825.1, filed on Mar. 23, 2018 and entitled "EQUIPMENT DISPLAY METHOD, APPARATUS, DEVICE AND STORAGE MEDIUM IN VIRTUAL ENVIRONMENT BATTLE", which are incorporated by reference herein in their entireties.

BACKGROUND

1. Field

Embodiments of the disclosure relate to the field of virtual environments, and in particular, to a method, an apparatus, a device, and a storage medium for displaying an equipment control in a virtual battle environment.

2. Description of Related Art

A virtual battle environment is a battle mode in which a plurality of virtual characters compete in a virtual environment. A user may operate a virtual character in the virtual environment for tactical competition. The virtual character may use a cold weapon or a hot weapon to kill other virtual characters.

In a typical virtual battle environment, taking a virtual character using firearms as an example, the same virtual character may have one pistol and two spears. A firearm equipment control is displayed in a battle picture of the virtual environment battle when a terminal uses a touchscreen to display the battle picture of the virtual environment battle. Two equipment slots on the weapon equipment control are displayed, where the first equipment slot displays a main long firearm used by the virtual character, and the second equipment slot displays a spare long firearm used by the virtual character. The user may switch between the main long gun and the spare long gun when clicking different equipment slots.

Since the virtual character may simultaneously have more than three firearm equipment, and the two equipment slots can display only two firearm equipment, an interface for displaying multiple firearms is not user-friendly and the efficiency of the user to view or switch his or her firearm equipment in the virtual battle environment is degraded.

SUMMARY

According to an embodiment, there is provided a method for displaying an equipment in a virtual environment battle, performed by a terminal, the method including: displaying a first battle interface of the virtual environment battle, the virtual environment battle being a battle mode in which a virtual character competes with other characters in a virtual environment; displaying a main equipment slot, an auxiliary equipment slot, and an expansion control interface in a first partial region of the first battle interface, the main equipment slot for displaying a main equipment of the virtual character, and the auxiliary equipment slot for displaying a first auxiliary equipment of the virtual character; receiving a first trigger signal on the expansion control interface; and displaying a second battle interface of the virtual environment battle and displaying the main equipment slot, the auxiliary equipment slot, and an expansion equipment slot in a second partial region of the second battle interface, and the expansion equipment slot for displaying a second auxiliary equipment owned by the virtual character other than the first auxiliary equipment.

According to an embodiment, there is provided an apparatus for displaying an equipment in a virtual environment battle, the apparatus including: at least one memory configured to store computer program code and at least one processor configured to access the memory and operate as instructed by the computer program code. The compute program code including: a displaying code configured to cause the at least one processor to display a first battle interface of the virtual environment battle, the virtual environment battle being a battle mode in which a virtual character competes with other characters in a virtual environment, and display a main equipment slot, an auxiliary equipment slot, and an expansion control interface in a first partial region of the first battle interface, the main equipment slot for displaying a main equipment of the virtual character, and the auxiliary equipment slot for displaying a first auxiliary equipment of the virtual character; an interaction code configured to cause the at least one processor to receive a first trigger signal on the expansion control interface; and the displaying code configured to cause the at least one processor to display a second battle interface of the virtual environment battle, and display the main equipment slot, the auxiliary equipment slot, and an expansion equipment slot a second partial region of the second battle interface, and the expansion equipment slot for displaying a second auxiliary equipment owned by the virtual character other than the first auxiliary equipment.

According to an embodiment, there is provided a non-transitory computer readable storage medium, storing at least one instruction, when the at least one instruction is loaded and executed by a processor, causes the processor to: display a first battle interface of the virtual environment battle, the virtual environment battle being a battle mode in which a virtual character competes with other characters in a virtual environment, and display a main equipment slot, an auxiliary equipment slot, and an expansion control interface in a first partial region of the first battle interface, the main equipment slot for displaying a main equipment of the virtual character, and the auxiliary equipment slot for displaying a first auxiliary equipment of the virtual character; receive a first trigger signal on the expansion control interface; and display a second battle interface of the virtual environment battle, and display the main equipment slot, the auxiliary equipment slot, and an expansion equipment slot a second partial region of the second battle interface, and the expansion equipment slot for displaying a second auxiliary equipment owned by the virtual character other than the first auxiliary equipment.

DESCRIPTION

Figure 1:
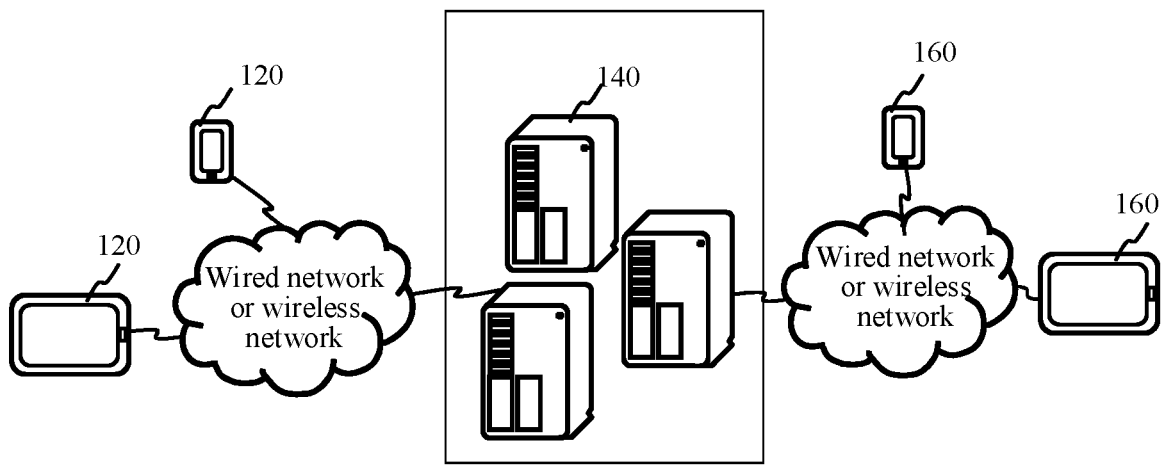
FIG. 1 is a structural block diagram of a computer system according to an embodiment.

To make the objectives, technical solutions, and advantages of the embodiments of the disclosure clearer, the following describes the embodiments in detail with reference to the accompanying drawings.

First, some of the terms are explained herein to assist in understanding the embodiments of the disclosure. However, these terms should not be construed to limit the scope of the terms. Unless specifically indicated otherwise, the terms may include commonly understood meaning of the terms and meanings that may be understood by one of ordinary skill in the art.

Virtual environment: A virtual environment may be displayed (or provided) when an application program runs on a terminal. The virtual environment may be a simulated environment in the real world, a semi-simulated and semi-fictitious virtual environment, or a purely fictitious virtual environment. The virtual environment may be any one of a two-dimensional virtual environment, a 2.5-dimensional virtual environment, and a three-dimensional virtual environment. The following embodiments illustrate the virtual environment as a three-dimensional virtual environment. For example, the virtual environment may also be used for a virtual environment battle between at least two virtual characters. Furthermore, the virtual environment may also be used for a battle between at least two virtual characters using virtual firearms. The virtual environment may also be used for a competition between at least two virtual characters using virtual firearms within a target region. The target region may decrease over time in the virtual environment.

Virtual environment battle: A virtual environment battle may be a single game mode in which a virtual character competes with other virtual characters in the virtual environment. For example, in the virtual environment battle, a moment at which the first client joins the battle may be a start moment, and a moment at which the last client exits the battle may be an end moment. Each client may be configured to control one or more virtual characters in the virtual environment. In addition, a competition mode of the virtual environment battle may include a single-player battle mode or a multi-player battle mode.

For example, the virtual environment battle may be a battle in a tactical competition game. When the first client clicks to start the game, a server receives a game start signal sent by the client, and creates a virtual environment battle according to the game start signal. Then, the client starting the game may automatically join the virtual environment battle created by the server when a number of virtual characters in the virtual environment battle reaches a preset number. Furthermore, the tactical competition game may be a game that firearms are used to compete for survival within a limited geographic range. The limited geographic range may decrease over time in the virtual environment.

Virtual object: A virtual object may be a movable or immobile object in the virtual environment. The movable object may be a virtual person, a virtual animal, an anime figure, or the like, for example, a person, an animal, a plant, an oil barrel, a wall, or a stone displayed in the virtual environment. The virtual character may be a character operated by a client, or may be artificial intelligence (AI) set in the virtual environment battle through training, or may be a non-player character (NPC) set in the virtual environment battle. Furthermore, the virtual character may be a virtual person competing in the virtual environment. In addition, a number of virtual characters in the virtual environment battle may be preset, or may be dynamically determined according to a number of clients joining the virtual environment battle.

Ground coordinate system: There may be a ground coordinate system when the virtual environment is the three-dimensional virtual environment. The ground coordinate system may be used for measuring coordinates, direction vectors, and motion vectors of virtual objects in the virtual environment. Generally, the ground coordinate system may include three coordinate axes: an X axis, a Y axis, and a Z axis. Also, a plane on which the X axis and the Z axis are located is a horizontal plane, that is, a reference ground, and an upper half axis of the Y axis represents a height relative to the ground. Posture parameters of the virtual object in the virtual environment may include three-dimensional coordinates (X, Y, Z), where X and Z may represent coordinates of the virtual object relative to the ground, and where Y may represent a width of the virtual object. The posture parameters of the virtual object in the virtual environment may further include a pitch angle, a yaw angle, and a roll angle. However, the posture parameters are not limited hereto, and may change or include other parameters to represent the virtual object in the virtual environment.

Camera model: A camera model may be a three-dimensional model around a virtual object in a three-dimensional virtual environment when the virtual environment is the three-dimensional virtual environment. Generally, each virtual object corresponds to a respective camera model. For example, the camera model may be near a head of the virtual object or on the head of the virtual object when a first person perspective is used. The camera model may be behind the virtual object (such as the head and shoulders of a virtual person) when a first-person over-shoulder perspective (also referred to as a third-person perspective) is used. An application program may display a corresponding display picture for a user to observe according to a perspective of the camera model in the virtual environment.

Battle picture: A battle picture may be an image in which the virtual environment is observed by using the camera model from the first-person perspective or over-shoulder perspective of the virtual character in a case that the virtual character performs tactical competition in the virtual environment.

FIG. 1 is a structural block diagram of a computer system according to an embodiment. The computer system 100 may include a first terminal 120, a server 140, and a second terminal 160.

An application program supporting a virtual environment may be installed and run on the first terminal 120. The application program may be any one of a virtual reality application program, a three-dimensional map program, a military simulation program, an FPS game, an MOBA game, and a multiplayer shootout survival game. The first terminal 120 is a terminal used by a first user, and the first user uses the first terminal 120 to operate a first virtual object in a virtual environment to perform an activity. The activity may include at least one of adjusting a body posture, crawling, walking, running, riding, jumping, driving, picking, shooting, attacking, throwing, etc. Here, the first virtual object may be a first virtual person such as a simulated person or an animation figure.

The first terminal 120 may be connected to the server 140 through a wireless network or a wired network.

The server 140 may be a plurality of servers, a cloud computing platform, and a virtualization center. The server 140 may be configured to provide a background service for the application program supporting the virtual environment. The server 140 may be responsible for the main calculation, and the first terminal 120 and the second terminal 160 may be responsible for secondary calculations. Alternatively, the server 140 may be responsible for secondary calculations, and the first terminal 120 and the second terminal 160 may be responsible for main calculations. In addition, a distributed computing architecture may be used for collaborative computing among the server 140, the first terminal 120, and the second terminal 160.

An application program supporting a virtual environment may be installed and run on the second terminal 160. The application program may be any one of a virtual reality application program, a three-dimensional map program, a military simulation program, an FPS game, an MOBA game, and a multiplayer shootout survival game. The second terminal 160 may be a terminal used by a second user, and the second user uses the second terminal 160 to operate a second virtual object in a virtual environment to perform an activity. The activity may include, but is not limited to, adjusting a body posture, crawling, walking, running, riding, jumping, driving, picking, shooting, attacking, and throwing. For example, the second virtual object may be a second virtual person such as a simulated person character or an animation person character.

Furthermore, the first virtual person and the second virtual person may be in the same virtual environment. In some embodiments, the first virtual person and the second virtual person may belong to the same team, the same organization, have a friend relationship, or have a temporary communication permission. In some other embodiments, the first virtual person and the second virtual person may be in different teams, different organizations, or have a hostile relationship. However, the relationship between the first virtual person and the second virtual person is not limited thereto.

In addition, application programs installed on the first terminal 120 and the second terminal 160 may be the same, or application programs installed on the two terminals may be a same type of applications on different operating system platforms. The different operating systems include, but are not limited to, a Windows operating system, an Android operating system, an IOS operating system, and a Linux operating system. The first terminal 120 may be one of a plurality of terminals, and the second terminal 160 may be one of a plurality of terminals. In this embodiment, only the first terminal 120 and the second terminal 160 are used as an example for the ease of description. Device types of the first terminal 120 and the second terminal 160 may be the same or different. The device type may include, for example, a smartphone, a tablet computer, a game console, an e-book reader, an MP3 player, an MP4 player, a laptop portable computer, and a desktop computer.

A person skilled in the art may understand that there may be more or fewer terminals. For example, there may be only one terminal, or more than one terminal. However, the number of terminals and the device type are not limited.

Figure 2:
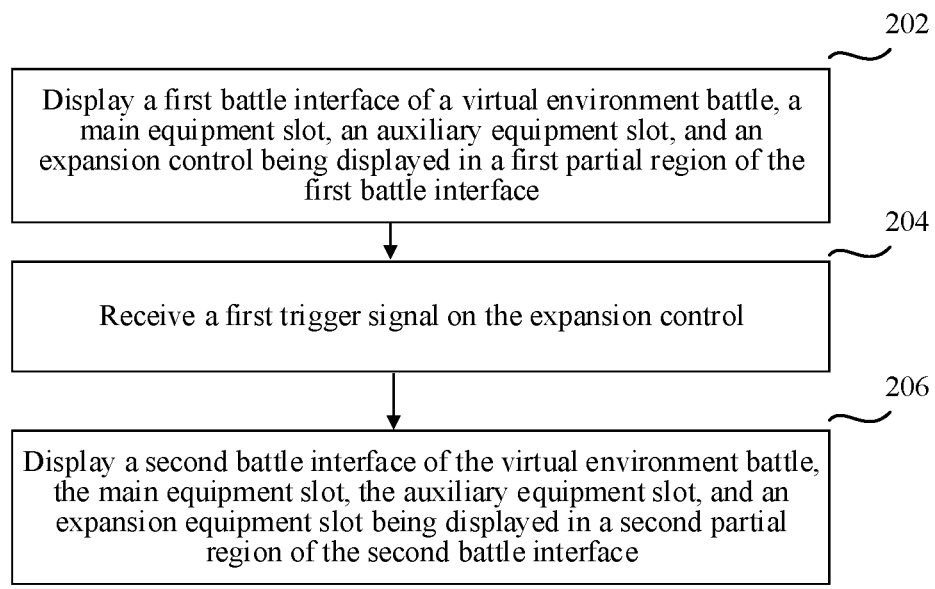
FIG. 2 is a flowchart of a method for displaying an equipment in a virtual environment battle according to an embodiment.

FIG. 2 is a flowchart of a method for displaying an equipment in a virtual environment battle according to an embodiment. According to an embodiment, the method may be performed by the terminal, such as the first terminal or the second terminal shown in FIG. 1, and the method may include the following steps.

In step 202, the method may include displaying a first battle interface of a virtual environment battle, a main equipment slot, an auxiliary equipment slot, and an expansion control interface displayed in a first partial region of the first battle interface.

A client (also referred to as an application program or an application program client) runs on the terminal, and the client provides a virtual environment battle function. The virtual environment battle may be a battle mode in which a virtual character competes with other characters in a virtual environment. The virtual environment battle may be a battle mode in which a virtual character uses firearms in a virtual environment within a limited geographic range to compete with other characters for survival. The client may be configured to control a virtual character in the virtual environment. The virtual character may be a virtual person, a virtual animal, or a purely fictitious character.

The first battle interface includes one or more image frames displayed by the client during competition of the virtual character. A main display region of the first battle interface displays a battle image of the virtual character at a first moment, and the battle image may be an image of the virtual environment being observed by using a camera model from a first-person perspective or over-shoulder perspective of the virtual character. The camera model is a camera view corresponding to a first virtual object, and the main equipment slot, the auxiliary equipment slot, and the expansion control interface may be displayed in the first partial region of the first battle interface.

In some embodiments, the terminal is a smartphone or a tablet computer, and the first battle interface may be a battle interface displayed in a landscape mode. In some other embodiments, the terminal is a notebook computer or a desktop computer, and the first battle interface may be displayed in a normal display mode.

The first partial region may be a region at an edge of the first battle interface. For example, the first partial region may be a central region at a lower edge of the first battle interface. As another example, the first partial region may be a region in an upper right corner of a right edge of the first battle interface. However, a specific location of the first partial region is not limited thereto.

The main equipment slot may be used for displaying a main equipment of the virtual character, and the auxiliary equipment slot may be used for displaying a first auxiliary equipment of the virtual character. The terminal may switch the first auxiliary equipment and the main equipment when receiving a trigger signal on the auxiliary equipment slot.

Specifically, the main equipment slot and the auxiliary equipment slot may be used for displaying a weapon equipment owned by the virtual character. The weapon equipment is a cold weapon and/or a hot weapon. The cold weapon includes, but is not limited to, a knife, a gun, a sword, a boring, a stick, a fork, a rake, a whip, a mace, a hammer, an axe, a hook, a sickle, a grill, a crutch, an arrow, a shield, a pan, a dagger, etc. The hot weapon includes, but is not limited to, a pistol, a submachine gun, an assault rifle, a sniper rifle, a shotgun, a machine gun, a grenade, a grenade launcher, a bazooka, a plastic bomb, a mortar, a shoulder-mounted anti-tank missile, a shoulder-mounted anti-aircraft missile, etc. Each type of firearm may have one or more different models.

The expansion control is a control for triggering display of an expansion equipment slot. A display area of an expansion control interface may be less than a display area of the expansion equipment slot. For example, the expansion control may be a button control with a downward arrow.

The main equipment slot, the auxiliary equipment slot, and the expansion control interface may appear in a sequence in a specified direction. In some embodiments, the main equipment slot, the auxiliary equipment slot, and the expansion control may appear in sequence from left to right in a central location of the lower edge of the first battle interface.

In step 204, the method may include receiving a first trigger signal of the expansion control.

The virtual character may have a default weapon equipment, or may obtain a weapon equipment through manual pickup or automatic pickup in the virtual environment. For example, the virtual character may snatch weapon equipment of other virtual characters in the virtual environment, or may obtain weapon equipment distributed in rewards by hurting or killing other virtual characters in the virtual environment. Therefore, the virtual character can have an equipment other than the main equipment and the first auxiliary equipment.

In some embodiments, the virtual character can have one main equipment and one or more auxiliary equipment. The main equipment is an equipment being used by the virtual character, and the auxiliary equipment is an equipment that is not currently being used, but that is stored in a storage slot (e.g., a virtual backpack) of the virtual character.

A user may click on the expansion control interface when the user needs to view or switch to other auxiliary equipment. Accordingly, the terminal receives the first trigger signal on the expansion control.

In step 206, the method may include displaying a second battle interface of the virtual environment battle, the main equipment slot, the auxiliary equipment slot, and an expansion equipment slot being displayed in a second partial region of the second battle interface.

The terminal displays the second battle interface. The second battle interface includes one or more image frames displayed by the client during competition of the virtual character. In addition, a main display region of the second battle interface displays a battle image of the virtual character at a second moment, and the battle image may be an image of the virtual environment being observed by using a camera model from a first-person perspective or over-shoulder perspective of the virtual character. The camera model may be a camera view corresponding to a second virtual character, and the main equipment slot, the auxiliary equipment slot, and the expansion equipment slot are displayed in the partial region of the second battle interface. The expansion equipment slot may be displayed after the expansion control is triggered. The expansion equipment slot may be used for displaying a second auxiliary equipment owned by the virtual character other than the first auxiliary equipment. In this case, the terminal may cancel display of an expansion control, or the terminal may replace the expansion control with a contraction control. The contraction control may be a control for retracting the expansion equipment slot.

The second partial region may be a region at an edge of the second battle interface. For example, the second partial region may be a central region at a lower edge of the second battle interface. As another example, the second partial region may be a region in an upper right corner of a right edge of the second battle interface. In this embodiment, a specific location of the second partial region is not limited thereto. Also, the first partial region and the second partial region may be identical, partially overlapping, or completely different.

The main equipment slot is used for displaying the main equipment of the virtual character, and the expansion equipment slot is used for displaying the second auxiliary equipment of the virtual character. The terminal may switch the second auxiliary equipment and the main equipment when receiving a trigger signal on the expansion equipment slot from a user.

Figure 3:
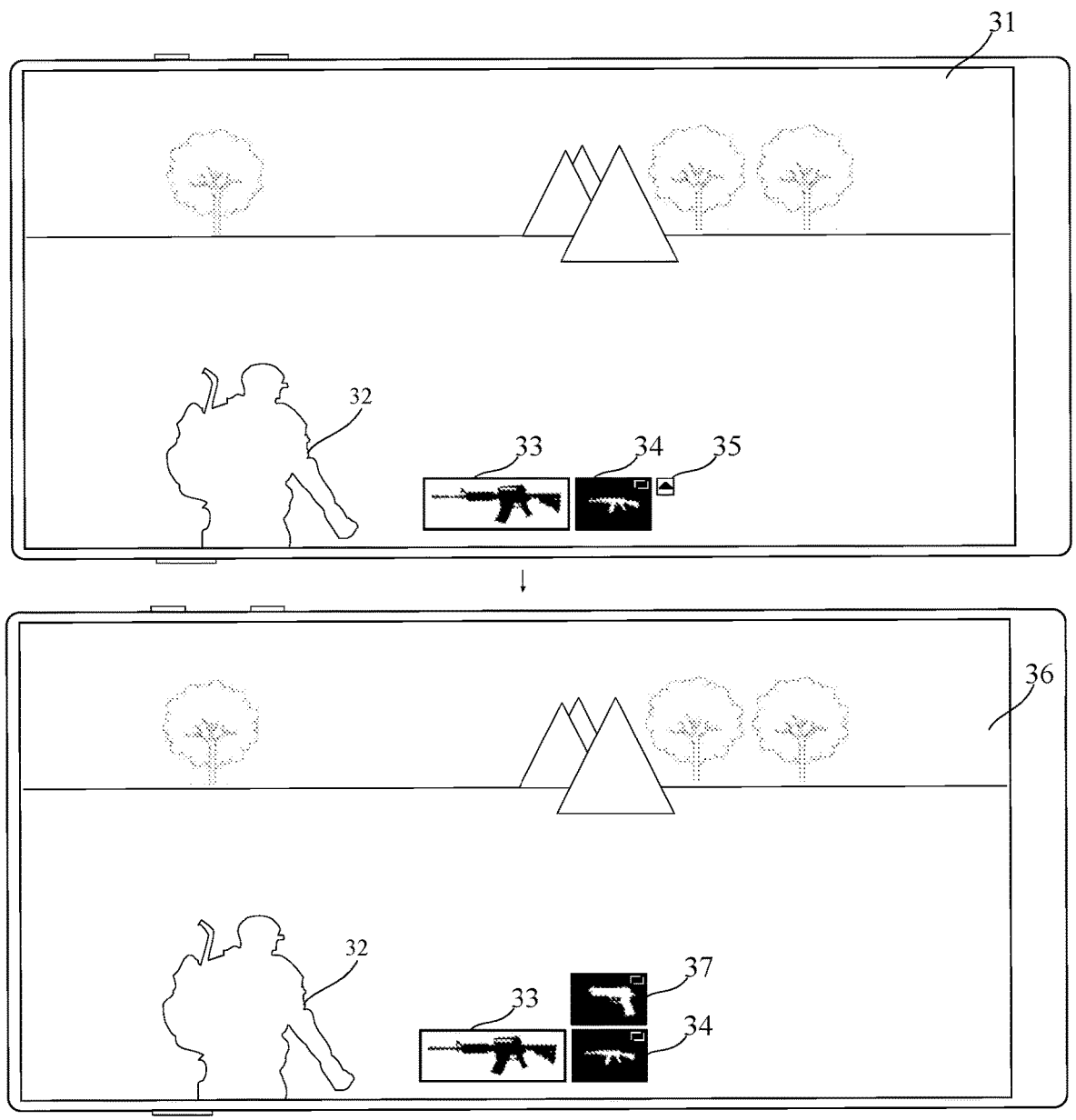
FIG. 3 is a schematic interface diagram of a method for displaying an equipment in a virtual environment battle according to an embodiment.

FIG. 3 is a schematic interface diagram of a method for displaying an equipment in a virtual environment battle according to an embodiment. Referring to FIG. 3, the terminal first displays a first battle interface 31 of the virtual environment battle. In the first battle interface 31, a battle image of a virtual character 32 at a first moment is displayed in a main display region of the first battle interface 31. A main equipment slot 33, an auxiliary equipment slot 34, and an expansion control interface 35 are also displayed in a partial region of the first battle interface 31. The main equipment slot 33 displays a main firearm being used by the virtual character 32, and the auxiliary equipment slot 34 displays a spare first auxiliary firearm of the virtual character 32. When the user needs to view or switch to other auxiliary firearms and clicks the expansion control interface 35, the terminal displays a second battle interface 36 in which an expansion equipment slot 37 is also displayed in a partial region of the second battle interface 36. Here, the expansion equipment slot 37 displays a spare second auxiliary firearm of the virtual character 32. There may be one or more auxiliary equipment slots 34 and one or more expansion equipment slots 37. In FIG. 3, only one auxiliary equipment slot 34 and only one expansion equipment slot 37 are shown as an example.

According to the equipment display method provided above, the main equipment slot, the auxiliary equipment slot, and the expansion control are displayed on the first battle interface of the virtual environment battle, and after the expansion control is triggered, the main equipment slot, the auxiliary equipment slot, and the expansion equipment slot are displayed on the second battle interface of the virtual environment battle. Here, the expansion equipment slot is used for displaying the second auxiliary equipment other than the first auxiliary equipment. As such, a number of auxiliary equipment slots can be dynamically changed according to user requirements, and equipment slots of a plurality of auxiliary equipment are provided for a user to switch between main and auxiliary equipment when the user has more equipment, so the user can more easily view and switch his or her equipment in a case that a virtual character simultaneously has a plurality of firearm equipment.

Figure 4:
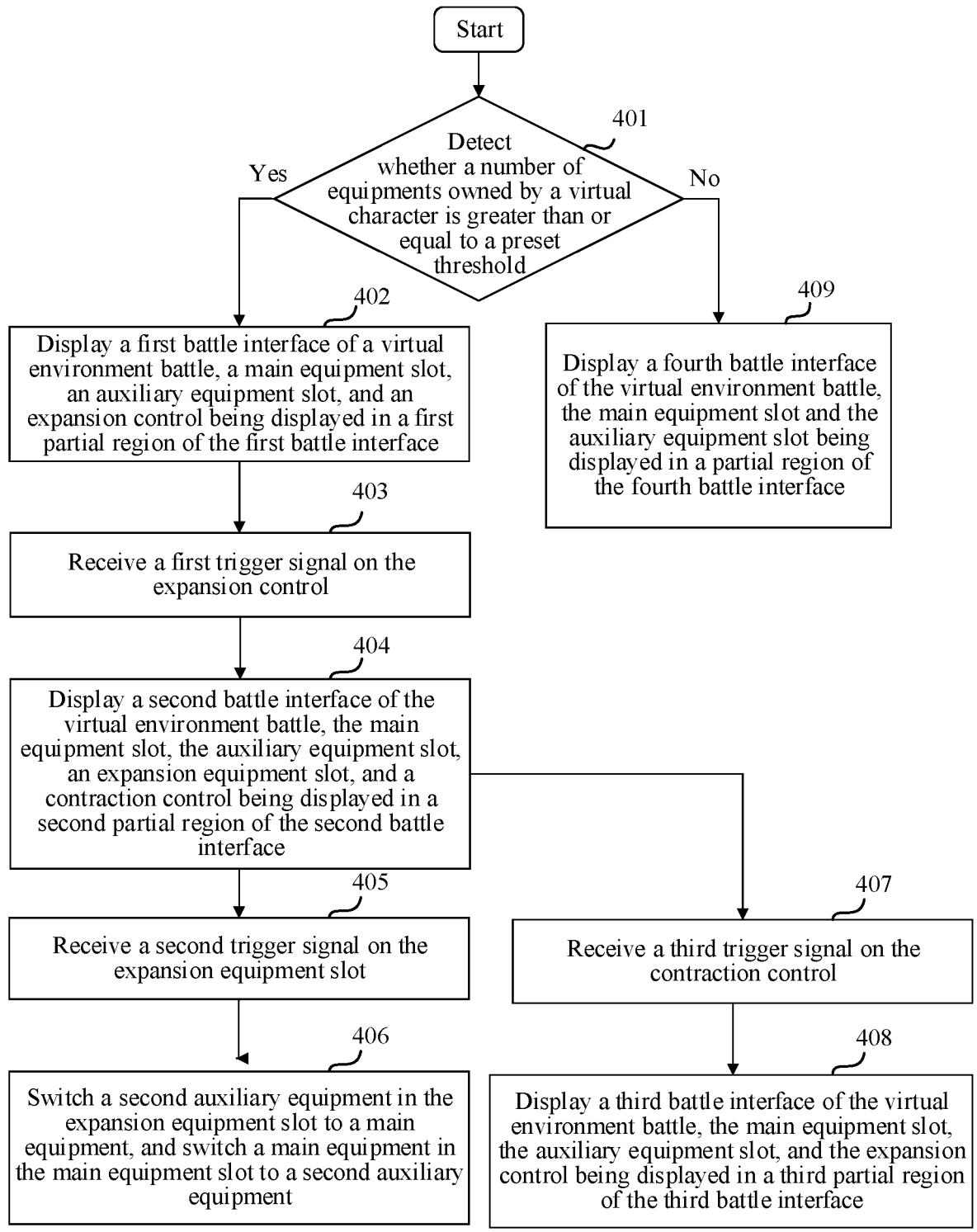
FIG. 4 is a flowchart of a method for displaying an equipment in a virtual environment battle according to an embodiment.

FIG. 4 is a flowchart of a method for displaying an equipment in a virtual environment battle according to an embodiment. Here, the method may include the following steps.

In step 401, the method may include detecting whether a number of equipment owned by a virtual character is greater than or equal to a preset threshold.

The virtual environment battle is a battle mode in which a virtual character competes with other characters in a virtual environment. Optionally, the virtual environment battle is a battle mode in which a virtual character uses firearms in a virtual environment within a limited geographic range to compete with other characters for survival. The client is configured to control a virtual character in the virtual environment. The virtual character may be a virtual person, a virtual animal, or a purely fictitious character.

The virtual character may have a default weapon equipment, or may obtain a weapon equipment through manual pickup or automatic pickup in the virtual environment, or may snatch weapon equipment of other virtual characters in the virtual environment, or may obtain weapon equipment distributed in rewards by hurting or killing other virtual characters in the virtual environment.

When displaying each frame of battle picture, the client detects whether the number of equipment owned by the virtual character is greater than or equal to the preset threshold. The preset threshold may be determined according to a number of main equipment slots and auxiliary equipment slots. For example, the preset threshold may be equal to the number of main equipment slots plus auxiliary equipment slots with an additional slot. Specifically, for example, the preset threshold may be 3 including 1 for the main equipment, 1 for the auxiliary equipment, and 1 for the additional equipment.

Based on detecting that the number of equipment is greater than or equal to the preset threshold, the method may perform step 402. Alternatively, based on detecting that the number of equipment is less than the preset threshold, the method may perform step 409.

In step 402, the method may include displaying a first battle interface of a virtual environment battle, a main equipment slot, an auxiliary equipment slot, and an expansion control interface in a first partial region of the first battle interface.

When the number of equipment owned by the virtual character is greater than or equal to the preset threshold, the virtual character has a large number of equipment, which exceeds a number of equipment that can be displayed in the main equipment slot and the auxiliary equipment slot. That is, there is a main equipment being used and at least two auxiliary equipment in possession by the virtual character.

Specifically, taking a firearm tactical competition game as an example, the main equipment may be a light machine gun, and the auxiliary equipment may include a sniper rifle and a pistol. When there are a plurality of auxiliary equipment, the client needs to determine a first auxiliary equipment displayed preferentially in the auxiliary equipment slot.

Accordingly, the client may determine display priorities of the at least two auxiliary equipment owned by the virtual character. For example, the client may determine, as the first auxiliary equipment, an auxiliary equipment whose display priority is higher than a first condition in the at least two auxiliary equipment, and may determine, as a second auxiliary equipment, an auxiliary equipment whose display priority is lower than a second condition in the at least two auxiliary equipment.

In an example, if the auxiliary equipment of the virtual character include a sniper rifle and a pistol, the sniper rifle has a wider damage range and a higher damage ability than the pistol, and the pistol is usually used as the main equipment only in the beginning of the game. Therefore, a display priority of the sniper rifle may be greater than a display priority of the pistol. Accordingly, the client may set the sniper rifle as the first auxiliary equipment and the pistol as the second auxiliary equipment.

In this case, the terminal displays the main equipment slot, the auxiliary equipment slot, and the expansion control in the first partial region of the first battle interface. The main equipment slot is used for displaying the main equipment of the virtual character, the auxiliary equipment slot is used for displaying the first auxiliary equipment of the virtual character, and the expansion control is used for triggering display of an expansion equipment slot.

Figure 5:
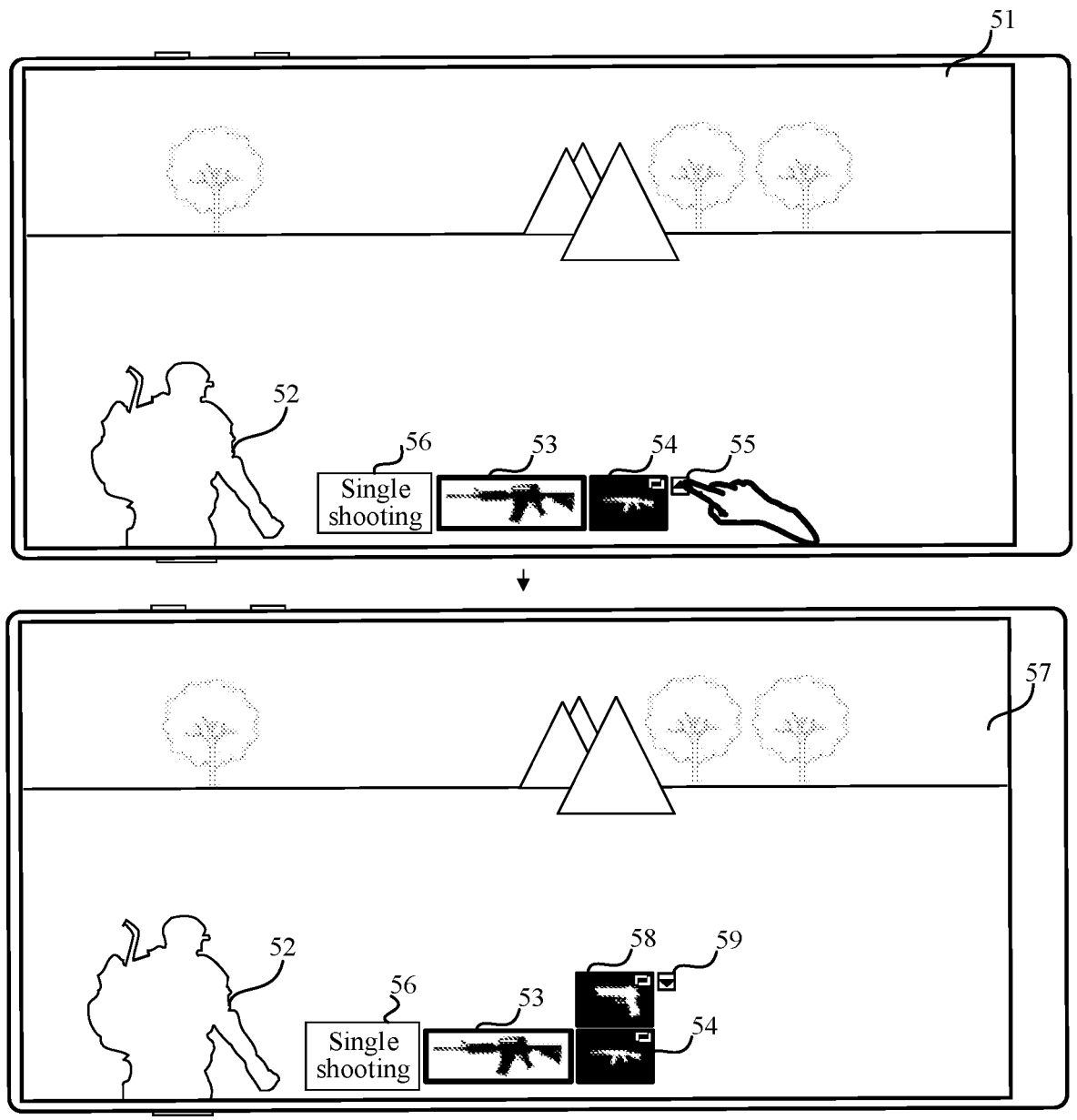
FIG. 5 is a schematic interface diagram of a method for displaying an equipment in a virtual environment battle according to an embodiment.

Referring to FIG. 5, the terminal displays a first battle interface 51 of the virtual environment battle, and a main display region of the first battle interface 51 displays a battle image of a virtual character 52 at a first moment. A main equipment slot 53, an auxiliary equipment slot 54, and an expansion control 55 are displayed in a first partial region of the first battle interface 51. The main equipment slot 53 displays a main firearm being used by the virtual character 52, and the auxiliary equipment slot 54 displays a spare first auxiliary firearm of the virtual character 52. Other controls or information may be further displayed on the first battle interface 51, for example, a number of remaining players, a current viewing angle, a mini map control, a direction rocker control, a side attack control, a backpack control, a throwing weapon trigger control, a clip change control, a control for switching the virtual character to a squat posture, a control for switching the virtual character to a lying posture, a control for controlling the virtual character to jump, a control for controlling the virtual character to use consumable equipment (a drug, an energy drink, and the like), a control for controlling the virtual character to continuously run, and a control for controlling the virtual character to switch a perspective. Furthermore, a shooting mode switching control 56 of a firearm is schematically shown. The shooting mode switching control 56 may be used for switching a shooting mode of the firearm among a "single" shooting mode, a "burst" shooting mode, and an "automatic" shooting mode. Single shooting may also be referred to as single-shot shooting or point shooting, burst shooting may also be referred to triple-burst shooting, and automatic shooting is a shooting mode in which continuous shooting is performed at a preset speed.

In step 403, the method may include receiving a first trigger signal on the expansion control.

The first trigger signal may include a single-click signal, a double-click signal, a slide signal, and a hover signal acting on the expansion control.

When the user clicks the expansion control to view or switch to other auxiliary equipment, the terminal receives the first trigger signal on the expansion control.

In step 404, the method may include displaying a second battle interface of the virtual environment battle, the main equipment slot, the auxiliary equipment slot, an expansion equipment slot, and a contraction control in a second partial region of the second battle interface, and the expansion equipment slot being used for displaying a second auxiliary equipment owned by the virtual character other than the first auxiliary equipment.

The terminal displays the second battle interface. The second battle interface includes one or more image frames displayed by the client during competition of the virtual character. The main equipment slot, the auxiliary equipment slot, and the expansion equipment slot are displayed in the second partial region of the second battle interface. The expansion equipment slot may be an equipment slot displayed after the expansion control is triggered. The expansion equipment slot may be used for displaying a second auxiliary equipment owned by the virtual character other than the first auxiliary equipment. In this case, the terminal may switch the expansion control to the contraction control, and the contraction control may be a control for triggering cancellation (or hiding and retraction) of the expansion equipment slot.

Referring to FIG. 5, a user clicks the expansion control 55 when the user needs to view or switch to other auxiliary firearms. The terminal displays a second battle interface 57 in which a battle image of the virtual character 52 at a second moment is displayed in a main display region of the second battle interface 57. The main equipment slot 53, the auxiliary equipment slot 54, a shooting mode switching control 56, an expansion equipment slot 58, and a contraction control 59 are also displayed in a partial region of the second battle interface 57. The expansion equipment slot 58 displays a spare second auxiliary firearm of the virtual character 52. In addition, there are one or more auxiliary equipment slots 54 and one or more expansion equipment slots 58. In FIG. 5, one auxiliary equipment slot 54 and one expansion equipment slot 57 are shown. However, the embodiment is not limited thereto.

In step 405, the method may include receiving a second trigger signal on the expansion equipment slot.

The second trigger signal may be triggered based on at least one of a single-click signal, a double-click signal, a slide signal, or a hover signal acting on the expansion equipment slot.

Figure 6:
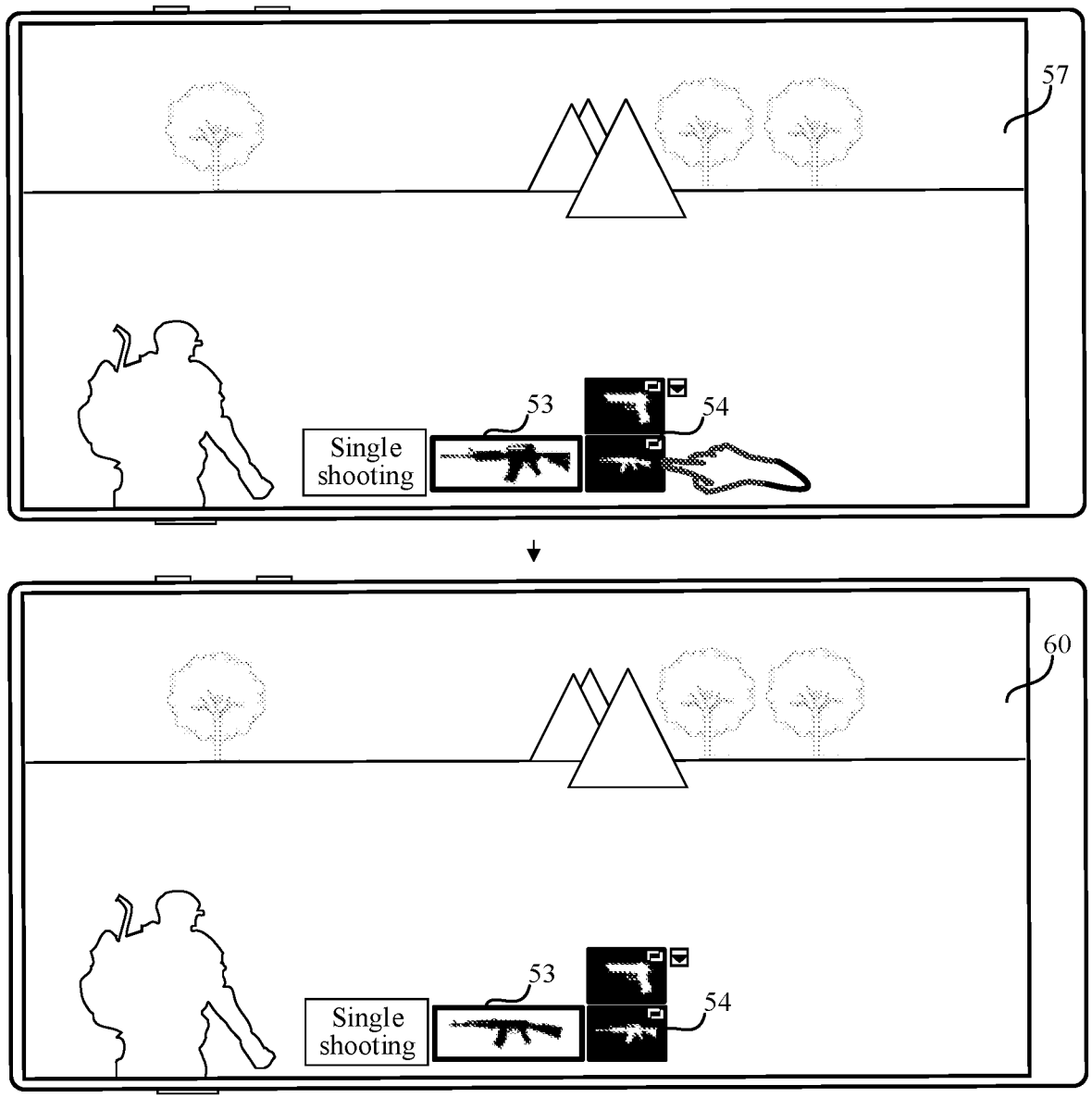
FIG. 6 is a schematic interface diagram of a method for displaying an equipment in a virtual environment battle according to an embodiment.

In addition, the auxiliary equipment slot provides a function of switching the main equipment and the first auxiliary equipment. Specifically, referring to FIG. 6, when the user clicks the auxiliary equipment slot 54, the client sets a firearm in the auxiliary equipment slot 54 as the main equipment, and sets a firearm in the main equipment slot 53 as the first auxiliary equipment, thereby switching the main equipment and the first auxiliary equipment.

Figure 7:
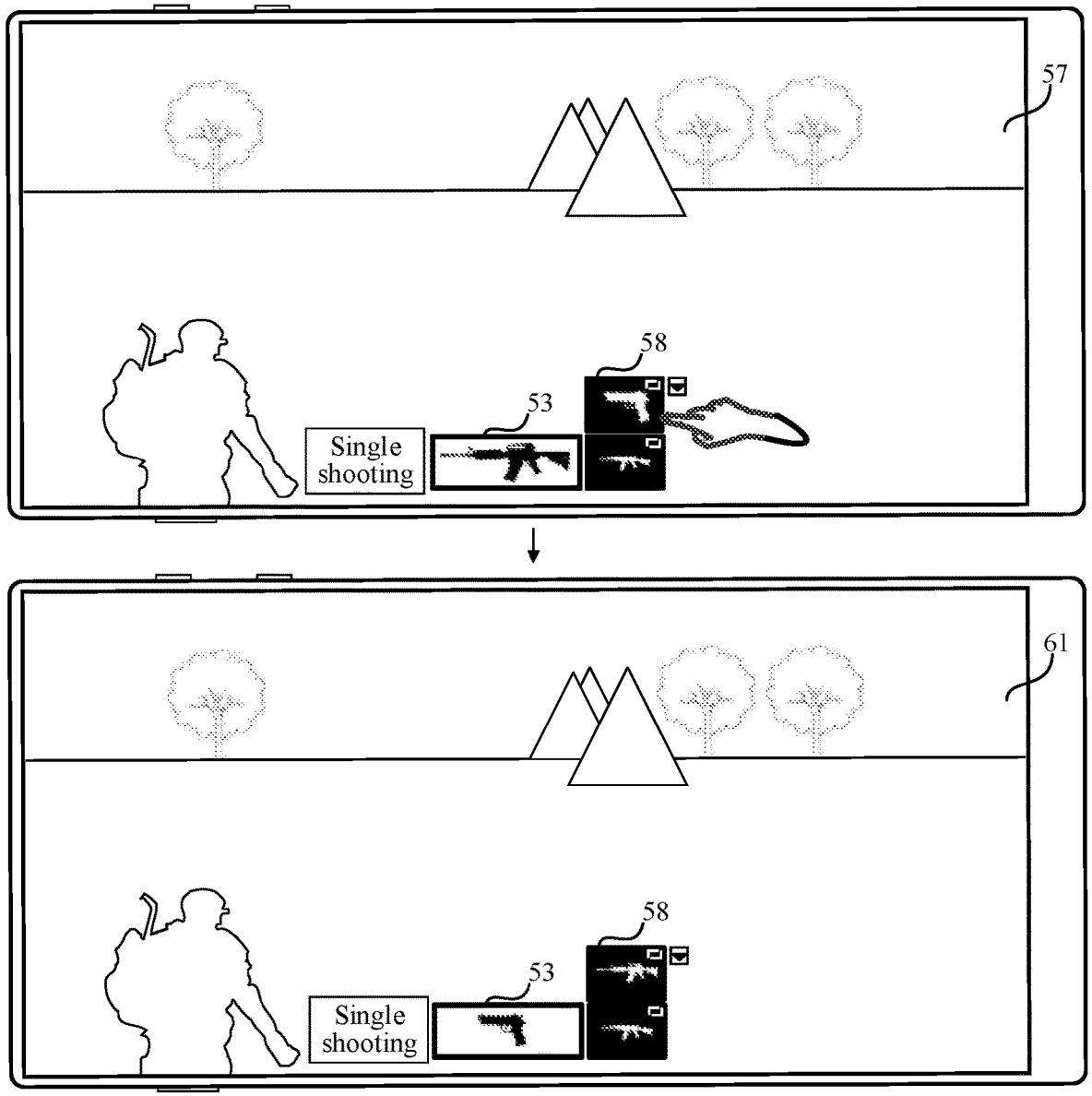
FIG. 7 is a schematic interface diagram of a method for displaying an equipment in a virtual environment battle according to an embodiment.
Figure 8:
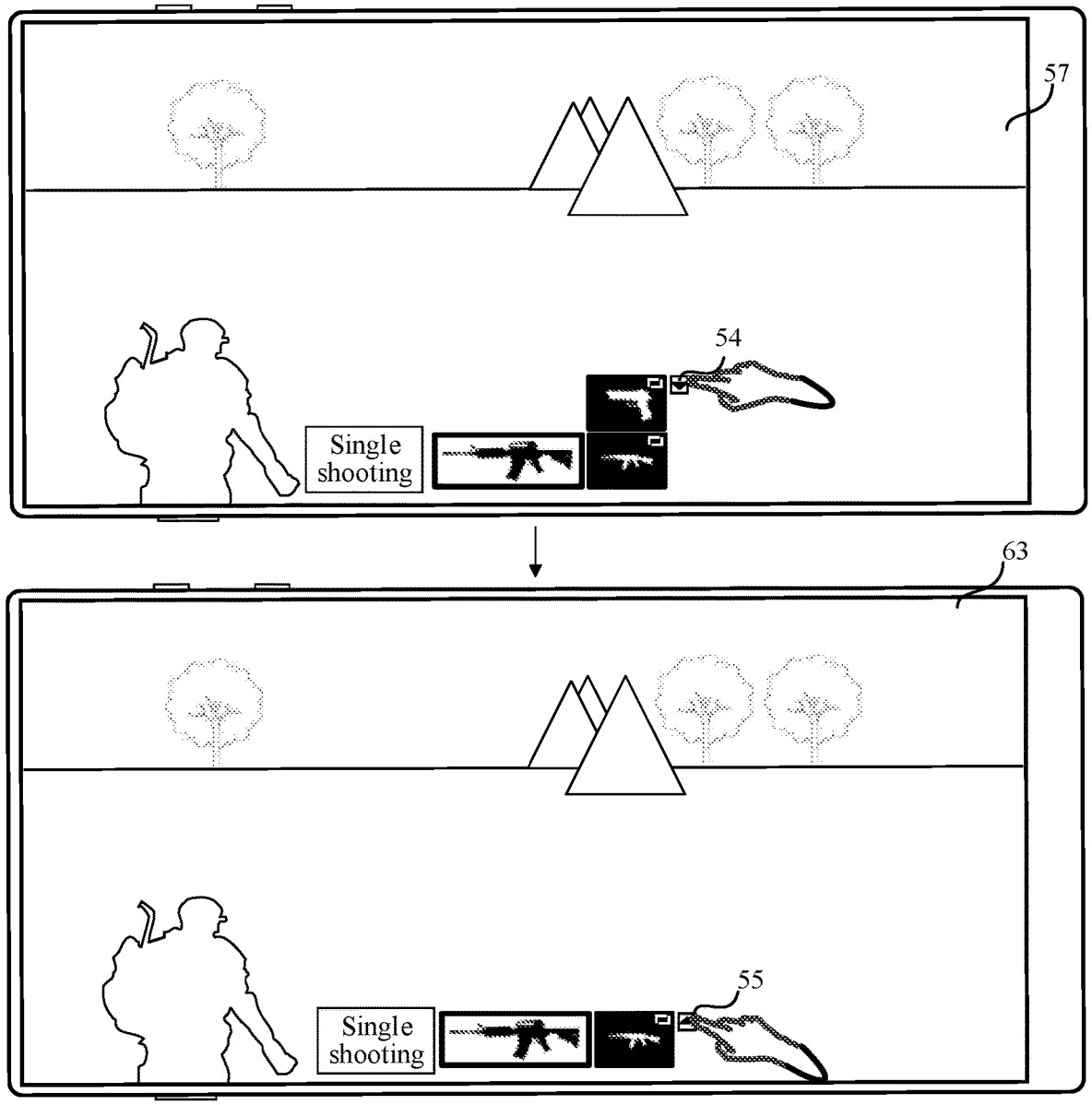
FIG. 8 is a schematic interface diagram of a method for displaying an equipment in a virtual environment battle according to an embodiment.
Figure 9:
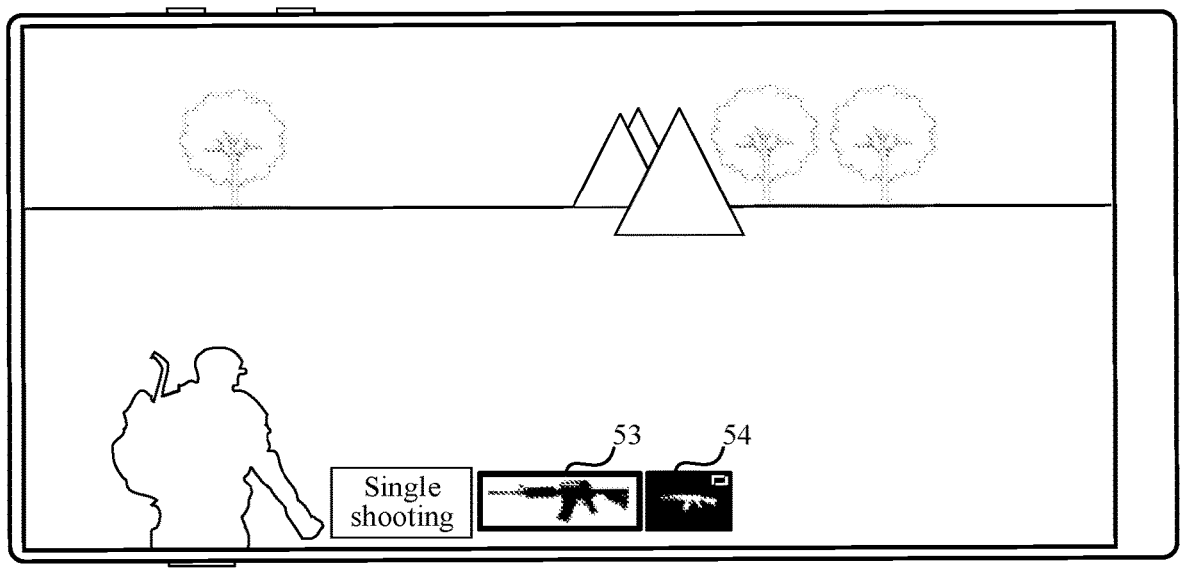
FIG. 9 is a schematic interface diagram of a method for displaying an equipment in a virtual environment battle according to an embodiment.

Furthermore, the expansion equipment slot provides a function of switching the main equipment and the second auxiliary equipment. Specifically, referring to FIG. 7, when the user clicks the expansion equipment slot 58, the client sets a firearm in the expansion equipment slot 58 as the main equipment, and sets a firearm in the main equipment slot 53 as the second auxiliary equipment.

In step 406, the method may include switching the second auxiliary equipment in the expansion equipment slot to the main equipment, and switching the main equipment in the main equipment slot to the second auxiliary equipment.

After the client switches the second auxiliary equipment and the main equipment, corresponding switched display is displayed in the main equipment slot and the auxiliary equipment slot.

Also, a theme color of the main equipment slot may be different from a theme color of the auxiliary equipment slot, and the theme color of the auxiliary equipment slot may be the same as a theme color of the expansion equipment slot.

For example, the theme color of the main equipment slot is a white background color and a black foreground color, the theme color of the auxiliary equipment slot is a black background color and a white foreground color, and the theme color of the expansion equipment slot is a black background color and a white foreground color.

A display area of the main equipment slot may be greater than a display area of the auxiliary equipment slot, and the display area of the auxiliary equipment slot may be the same as a display area of the expansion equipment slot. For example, widths of the main equipment slot, the auxiliary equipment slot, and the expansion equipment slot may be the same, a length of the main equipment slot may be greater than a length of the auxiliary equipment slot, and the length of the auxiliary equipment slot may be the same as a length of the expansion equipment slot.

Step 405 and step 406 may be triggered by the user, and an execution timing depends on the user's second trigger signal. However, the execution timing of step 405 and step 406 may not be limited in this embodiment.

In step 407, the method may include receiving a third trigger signal of a contraction control.

Because the expansion equipment slot needs to occupy a specified display area, a battle image in the second battle interface may be blocked or partially not viewable to the user. If the user expects to cancel display of the expansion equipment slot, the third trigger signal may be triggered on the contraction control interface displayed on the terminal.

In step 408, the method may include displaying a third battle interface of the virtual environment battle in which the main equipment slot, the auxiliary equipment slot, and the expansion control are displayed in a third partial region of the third battle interface.

After receiving the third trigger signal on the contraction control, the client displays the third battle interface of the virtual environment battle. A main display region of the third battle interface displays a battle picture of the virtual character at a third moment, and the battle picture is a picture when the virtual environment is observed by using a camera model from a first-person perspective or over-shoulder perspective of the virtual character. The main equipment slot, the auxiliary equipment slot, and the expansion control are displayed in a partial region of the third battle interface. That is, display of the expansion equipment slot and the contraction control is cancelled on the third battle interface.

In addition, the first partial region and the third partial region may be identical, partially overlapping, or completely different.

Due to continuation of a battle process, battle pictures in the first battle interface and the third battle interface are usually different. Although the main equipment slot, the auxiliary equipment slot, and the expansion control are displayed on both the first battle interface and the third battle interface, equipment displayed in the main equipment slot and the auxiliary equipment slot may be different.

In step 409, the method may include displaying a fourth battle interface of the virtual environment battle, the main equipment slot and the auxiliary equipment slot being displayed in a partial region of the fourth battle interface, the main equipment slot being used for displaying the main equipment of the virtual character, and the auxiliary equipment slot being used for displaying the first auxiliary equipment of the virtual character.

When the number of equipment owned by the virtual character is less than the preset threshold, the virtual character has a small number of equipment, which does not exceed the number of equipment that can be displayed in the main equipment slot and the auxiliary equipment slot. The client displays the fourth battle interface of the virtual environment battle, to reduce blocking of a battle picture. The main equipment slot and the auxiliary equipment slot are displayed in a fourth partial region of the fourth battle interface, and the expansion control is not included on the fourth battle interface.

Furthermore, the first partial region and the fourth partial region may be identical, partially overlapping, or completely different.

In view of the equipment display method provided above, the main equipment slot, the auxiliary equipment slot, and the expansion control may be displayed on the first battle interface of the virtual environment battle, and after the expansion control is triggered, the main equipment slot, the auxiliary equipment slot, and the expansion equipment slot are displayed on the second battle interface of the virtual environment battle, the expansion equipment slot being used for displaying the second auxiliary equipment other than the first auxiliary equipment. In this way, a number of auxiliary equipment slots can be dynamically changed according to user requirements, and equipment slots of a plurality of auxiliary equipment are provided for a user to switch between main and auxiliary equipment when the user has more equipment, so that a problem that human-computer interaction efficiency is low when the user views or switches an owned firearm equipment in a case that a virtual character simultaneously has a plurality of firearm equipment is resolved.

According to an embodiment, the second auxiliary equipment in the expansion equipment slot and the main equipment in the main equipment slot are further switched after the expansion equipment slot is triggered, so that when the virtual character has a plurality of firearms simultaneously, the user can quickly switch the second auxiliary equipment and the main equipment in the main equipment slot.

According to an embodiment, the contraction control is further displayed on the second battle interface. When the contraction control is triggered, display of the expansion equipment slot may be disappeared (e.g., hidden), thereby reducing blocking of the expansion equipment slot on a battle image and increasing an area of the battle picture that can be observed by the user.

The first battle interface including the expansion control is displayed when the number of equipment owned by the virtual character exceeds a predetermined threshold, and the fourth battle interface excluding the expansion control is displayed when the number of equipment owned by the virtual character does not exceed the predetermined threshold. As such, display of an equipment control is dynamically changed according to the number of equipment owned by the virtual character, thereby reducing blocking of the expansion control on a battle image and increasing an effective display area of the battle image.

According to the equipment display method provided in this embodiment, a firearm status (for example, a firearm status after the user clicks switching of main and auxiliary equipment) of the virtual character is refreshed by the server in real time when each frame of battle picture is displayed, and a priority is displayed to determine a weapon displayed in each equipment slot. Because each frame is refreshed and displayed according to an actual obtained firearm status, inconsistency caused by a network delay between different clients is avoided.

Figure 10:
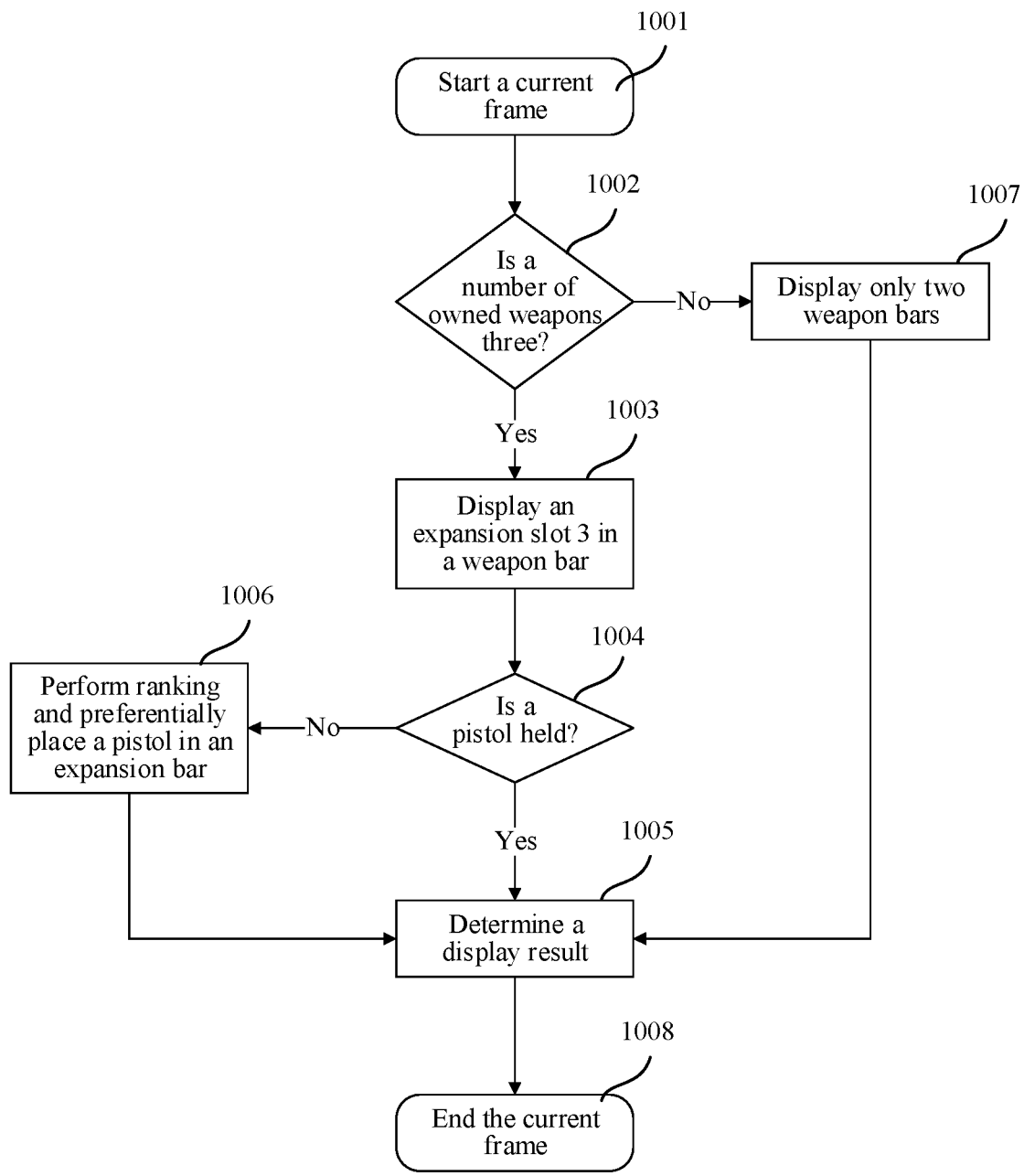
FIG. 10 is a flowchart of a method for displaying an equipment in a virtual environment battle according to an embodiment.

Referring to FIG. 10, for example when a current frame is displayed, a client obtains a number of weapons owned by a virtual character (S1001). In S1002, the client detects whether the number of weapons owned by the virtual character is three, and when the number of owned weapons is three, step S1003 is performed, or when the number of owned weapons is two, step S1007 is performed. Here, the number of weapons owned by the virtual character may not be limited to three, and a predetermined number for checking the number of weapons may be any other number. In S1003, an expansion slot 3 in a weapon bar is displayed based on a displayed main equipment slot 1 and an auxiliary equipment slot 2. In S1004, the client detects whether a main equipment of the virtual character is a pistol, and when the main equipment is a pistol, step 1005 is performed, or when the main equipment is not a pistol, step 1006 is performed. In S1005, a display result is determined according to a priority of each auxiliary equipment. In S1006, ranking is determined according to the priority of each auxiliary equipment, and a pistol is preferentially placed in the expansion slot 3. In S1007, only the main equipment slot 1 and the auxiliary equipment slot 2 are displayed when the number of weapons owned by the virtual character is less than three.

According to an embodiment, there is provided an apparatus for performing the above-described methods.

Figure 11:
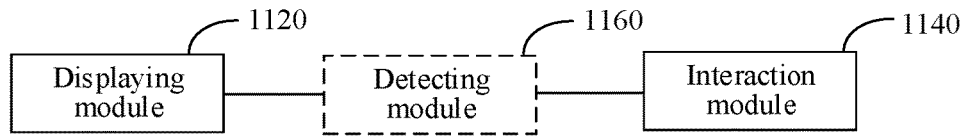
FIG. 11 is a block diagram of an apparatus for displaying an equipment in a virtual environment battle according to an embodiment.

FIG. 11 is a structural block diagram of an apparatus for displaying an equipment in a virtual environment battle according to an embodiment. The apparatus may be implemented as a part of a terminal or an entire terminal by using software, hardware, or a combination thereof. The apparatus may include: a displaying module 1120 configured to display a first battle interface of the virtual environment battle, the virtual environment battle being a battle mode in which a virtual character competes with other characters in a virtual environment, a main equipment slot, an auxiliary equipment slot, and an expansion control being displayed in a first partial region of the first battle interface, the main equipment slot being used for displaying a main equipment of the virtual character, and the auxiliary equipment slot being used for displaying a first auxiliary equipment of the virtual character, an interaction module 1140 configured to receive a first trigger signal on the expansion control, and the displaying module 1120 configured to display a second battle interface of the virtual environment battle, the main equipment slot, the auxiliary equipment slot, and an expansion equipment slot being displayed in a second partial region of the second battle interface, and the expansion equipment slot being used for displaying a second auxiliary equipment owned by the virtual character other than the first auxiliary equipment.

In an embodiment, the interaction module 1140 may be configured to receive a second trigger signal on the expansion equipment slot. The displaying module 1120 may be configured to switch the second auxiliary equipment in the expansion equipment slot to the main equipment, and switch the main equipment in the main equipment slot to the second auxiliary equipment.

In an embodiment, the second battle interface further displays a contraction control. In this case, the interaction module 1140 may be configured to receive a third trigger signal on the contraction control and the displaying module 1120 may be configured to display a third battle interface of the virtual environment battle, the main equipment slot, the auxiliary equipment slot, and the expansion control being displayed in a third partial region of the third battle interface.

In an embodiment, the displaying module 1120 may be configured to determine display priorities of at least two auxiliary equipment owned by the virtual character, determine, as the first auxiliary equipment, an auxiliary equipment whose display priority is higher than a first condition in the at least two auxiliary equipment, and determine, as the second auxiliary equipment, an auxiliary equipment whose display priority is lower than a second condition in the at least two auxiliary equipment.

In an embodiment, the apparatus may further include a detecting module 1160.

The detecting module 1160 may be configured to detect whether a number of equipment owned by the virtual character is greater than or equal to a preset threshold, the preset threshold being related to a number of main equipment slots and auxiliary equipment slots. Here, the preset threshold may be set by the application or the user.

The displaying module 1120 is configured to display the first battle interface of the virtual environment battle in a case that the detecting module detects that the number of equipment owned by the virtual character is greater than or equal to the preset threshold. The division of the foregoing functional modules is described only as an example. In actual application, the foregoing functions may be variously modified, implemented with different functional modules or may be combined. That is, an inner structure of the apparatus is divided into different functional modules to implement all or a part of the functions described above.

Figure 12:
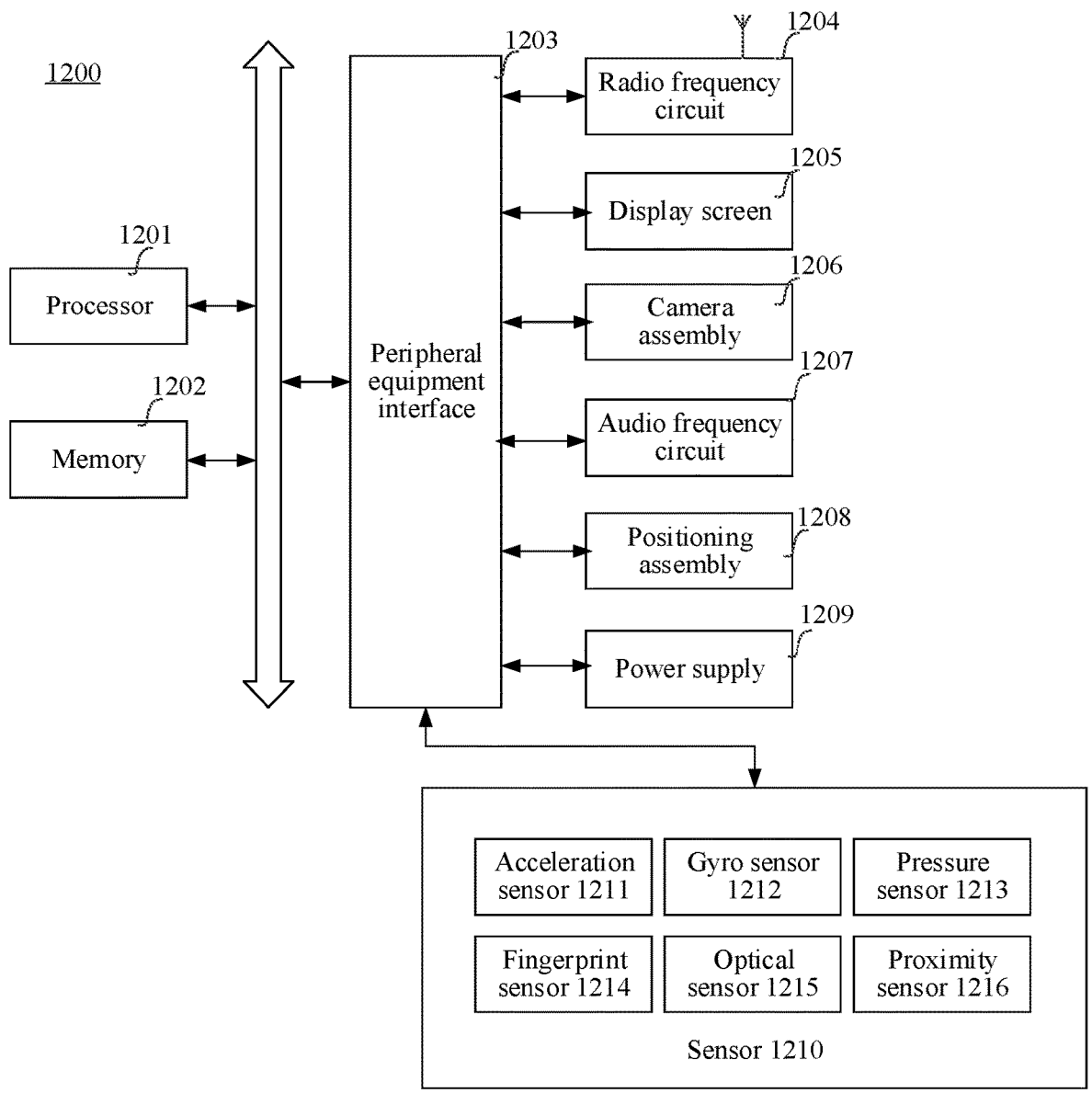
FIG. 12 is a block diagram of a terminal according to an embodiment.

FIG. 12 shows a structural block diagram of a terminal 1200 according to an embodiment. The terminal 1200 may be a smartphone, a tablet computer, a moving picture experts group audio layer III (MP3) player, a moving picture experts group audio layer IV (MP4) player, a notebook computer, or a desktop computer. The terminal 1200 may also be referred to as another name such as user equipment, a portable terminal, a laptop terminal, or a desktop terminal. The terminal 1200 may be the first terminal or the second terminal in the foregoing method embodiments.

The terminal 1200 includes a processor 1201 and a memory 1202.

The processor 1201 may include one or more processing cores, for example, a 4-core processor or an 8-core processor. The processor 1201 may be implemented in at least one hardware form of digital signal processing (DSP), a field-programmable gate array (FPGA), and a programmable logic array (PLA). The processor 1201 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 1201 may be integrated with a graphics processing unit (GPU). The GPU is configured to be responsible for rendering and depicting content that a display screen needs to display. In some embodiments, the processor 1201 may further include an artificial intelligence (AI) processor. The AI processor is configured to process a calculation operation related to machine learning.

The memory 1202 may include one or more computer-readable storage media. The computer-readable storage media may be non-transient. The memory 1202 may further include a high-speed random access memory, and a non-volatile memory such as one or more magnetic disk storage devices and a flash memory device. In some embodiments, the non-transient computer-readable storage medium in the memory 1202 is configured to store at least one instruction. The at least one instruction is executed by the processor 1201 to perform the method for displaying an equipment in a virtual environment battle provided in the method embodiment.

In some embodiments, the terminal 1200 may further include a peripheral device interface 1203 and at least one peripheral device. The processor 1201, the memory 1202, and the peripheral device interface 1203 may be connected through a bus or a signal cable. Each peripheral device may be connected to the peripheral device interface 1203 through a bus, a signal cable, or a circuit board. Specifically, the peripheral device includes: at least one of a radio frequency (RF) circuit 1204, a touch display screen 1205, a camera component 1206, an audio frequency circuit 1207, a positioning component 1208, and a power supply 1209.

The peripheral device interface 1203 may be configured to connect at least one peripheral device related to input/output (I/O) to the processor 1201 and the memory 1202. In some embodiments, the processor 1201, the memory 1202, and the peripheral device interface 1203 are integrated into the same chip or circuit board. In some other embodiments, any one or two of the processor 1201, the memory 1202, and the peripheral device interface 1203 may be implemented on an independent chip or circuit board, and the implementation is not limited in this embodiment.

The RF circuit 1204 is configured to receive and transmit an RF signal, also referred to as an electromagnetic signal. The RF circuit 1204 communicates with a communications network and another communications device by using the electromagnetic signal. The RF circuit 1204 may convert an electric signal into an electromagnetic signal for transmission, or convert a received electromagnetic signal into an electric signal. Furthermore, the RF circuit 1204 includes an antenna system, an RF transceiver, one or more amplifiers, a tuner, an oscillator, a digital signal processor, a codec chip set, a subscriber identity module card, and the like. The radio frequency circuit 1204 may communicate with another terminal by using a wireless communications protocol. The wireless communication protocol includes, but is not limited to, a world wide web, a metropolitan area network, an intranet, generations of mobile communication networks (2G, 3G, 4G, and 5G), a wireless local area network and/or a wireless fidelity (Wi-Fi) network. In some embodiments, the RF circuit 1204 may also include a circuit related to near field communication (NFC).

The display screen 1205 is configured to display a user interface (UI). The UI may include a graph, text, an icon, a video, and any combination thereof. In a case that the display screen 1205 is a touch display screen, the display screen 1205 is further capable of collecting a touch signal on or over a surface of the display screen 1205. The touch signal may be inputted into the processor 1201 as a control signal for processing. In this case, the display screen 1205 may be further configured to provide a virtual button and/or a virtual keyboard, also referred to as a soft button and/or a soft keyboard. In some embodiments, there is one display screen 1205, disposed on a front panel of the terminal 1200. In some other embodiments, there may be two display screens 1205, respectively disposed on different surfaces of the terminal 1200 or designed in a foldable shape. In some embodiments, the display screen 1205 may be a flexible display screen, disposed on a curved surface or a folded surface of the terminal 1200. Even, the display screen 1205 may be further set to have a non-rectangular irregular graph, that is, a special-shaped screen. The display screen 1205 may be manufactured by using a material such as a liquid crystal display (LCD), an organic light-emitting diode (OLED), or the like.

The camera component 1206 may be configured to collect an image or a video. The camera component 1206 may include a front-facing camera and a rear-facing camera. Generally, the front-facing camera is disposed on a front panel of the terminal, and the rear-facing camera is disposed on a back face of the terminal. In some embodiments, there may be at least two rear-facing cameras, each being any one of a main camera, a depth of field camera, a wide-angle camera, and a telephoto camera, to implement a Bokeh function through fusion of the main camera and the depth of field camera, panoramic photo shooting and virtual reality (VR) shooting functions through fusion of the main camera and wide-angle camera, or another fusion shooting function. In some embodiments, the camera component 1206 may further include a flash. The flash may be a monochrome temperature flash, or may be a double color temperature flash. The double color temperature flash refers to a combination of a warm flash and a cold flash, and may be configured to perform light ray compensation at different color temperatures.

The audio frequency circuit 1207 may include a microphone and a loudspeaker. The loudspeaker may be configured to collect sound waves of a user and an environment, and convert the sound waves into electric signals and input the electrical signals into the processor 1201 for processing, or input the electrical signals into the radio frequency circuit 1204 to implement speech communication. For the purpose of stereo sound collection or noise reduction, there may be a plurality of microphones, respectively disposed at different parts of the terminal 1200. The microphone may be further a microphone array or an omnidirectional collection microphone. The loudspeaker is configured to convert electric signals from the processor 1201 or the radio frequency circuit 1204 into sound waves. The loudspeaker may be a conventional thin-film loudspeaker or a piezoelectric ceramic loudspeaker. In a case that the loudspeaker is the piezoelectric ceramic loudspeaker, electric signals not only can be converted into sound waves that can be heard by human, but also can be converted into sound waves that cannot be heard by human for ranging and the like. In some embodiments, the audio frequency circuit 1207 may further include an earphone jack.

The positioning component 1208 is configured to position a current geographic location of the terminal 1200, to implement a navigation or a location based service (LBS). The positioning component 1208 may be a positioning component based on the global positioning system (GPS) of the United States, the BeiDou Navigation Satellite System (BDS) of China, or the Galileo system of Russia.

The power supply 1209 may be configured to supply power to components in the terminal 1200. The power supply 1209 may be an alternating current, a direct current, a primary battery, or a rechargeable battery. In a case that the power supply 1209 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may be further configured to support a quick charge technology.

In some embodiments, the terminal 1200 further includes one or more sensors 1210. The one or more sensors 1210 include, but are not limited to, an acceleration sensor 1211, a gyroscope sensor 1212, a pressure sensor 1213, a fingerprint sensor 1214, an optical sensor 1215, and a proximity sensor 1216.

The acceleration sensor 1211 may detect acceleration on three coordinate axes of a coordinate system established by the terminal 1200. For example, the acceleration sensor 1211 may be configured to detect components of gravity acceleration on the three coordinate axes. The processor 1201 may control, according to a gravity acceleration signal collected by the acceleration sensor 1211, the touch display screen 1205 to display the UI in a frame view or a portrait view. The acceleration sensor 1211 may be further configured to collect motion data of a game or a user.

The gyroscope sensor 1212 may detect a body direction and a rotation angle of the terminal 1200. The gyroscope sensor 1212 may cooperate with the acceleration sensor 1211 to collect a 3D action by the user on the terminal 1200. The processor 1201 may implement the following functions according to the data collected by the gyroscope sensor 1212: motion sensing (such as changing the UI according to a tilt operation of the user), image stabilization at shooting, game control, and inertial navigation.

The pressure sensor 1213 may be disposed at a side frame of the terminal 1200 and/or a lower layer of the touch display screen 1205. When the pressure sensor 1213 is disposed on the side frame of the terminal 1200, a holding signal of the user on the terminal 1200 may be detected. The processor 1201 performs left and right hand recognition or a quick operation according to the holding signal collected by the pressure sensor 1213. When the pressure sensor 1213 is disposed on the low layer of the display screen 1205, the processor 1201 controls, according to a pressure operation of the user on the display screen 1205, an operable control on the UI. The operable control includes at least one of a button control, a scroll bar control, an icon control, and a menu control.

The fingerprint sensor 1214 is configured to collect a fingerprint of the user. The processor 1201 identifies an identity of the user according to the fingerprint collected by the fingerprint sensor 1214, or the fingerprint sensor 1214 identifies an identity of the user according to the collected fingerprint. In a case that the identity of the user is identified as a trusted identity, the processor 1201 authorizes the user to perform a related sensitive operation. The sensitive operation includes unlocking a screen, viewing encrypted information, downloading software, payment, changing settings, and the like. The fingerprint sensor 1214 may be disposed on a front face, a back face, or a side face of the terminal 1200. When a physical button or a vendor logo is disposed on the terminal 1200, the fingerprint 1214 may be integrated with the physical button or the vendor logo.

The optical sensor 1215 is configured to collect ambient light intensity. In an embodiment, the processor 1201 may control display luminance of the touch display screen 1205 according to the ambient light intensity collected by the optical sensor 1215. Specifically, in a case that the ambient light intensity is relatively high, the display luminance of the touch display screen 1205 is increased. In a case that the ambient light intensity is relatively low, the display luminance of the touch display screen 1205 is reduced. In another embodiment, the processor 1201 may further dynamically adjust shooting parameters of the camera component 1206 according to the ambient light intensity collected by the optical sensor 1215.

The proximity sensor 1216, also referred to as a distance sensor, is usually disposed on the front panel of the terminal 1200. The proximity sensor 1216 is configured to collect a distance between a front face of the user and the front face of the terminal 1200. In an embodiment, when the proximity sensor 1216 detects that the distance between the front face of the user and the front face of the terminal 1200 is gradually decreased, the processor 1201 controls the display screen 1205 to switch from a screen-on state to a screen-off state. When the proximity sensor 1216 detects that the distance between the front face of the user and the front face of the terminal 1200 is gradually increased, the processor

1201 controls the display screen 1205 to switch from the screen-off state to the screen-on state.

A person skilled in the art may understand that the structure shown in FIG. 12 does not constitute a limitation to the terminal 1200, and the terminal may include more components or fewer components than those shown in the figure, or some components may be combined, or a different component deployment may be used.

A computer-readable storage medium may be further provided according to an embodiment, the storage medium storing at least one instruction, at least one section of program, a code set, or an instruction set, and the at least one instruction, the at least one section of program, the code set, or the instruction set being loaded and executed by the processor to implement the method for displaying an equipment in a virtual environment battle according to the foregoing method embodiments.

A computer program product may be further provided. When the computer program product is run on a terminal, causes the terminal to perform the method for displaying an equipment in a virtual environment battle according to the foregoing method embodiments.

A person of ordinary skill in the art may understand that all or some of the steps of the embodiments may be implemented by hardware or a program instructing related hardware. The program may be stored in a computer-readable storage medium. The storage medium may be a read-only memory (ROM), a magnetic disk, an optical disc, or the like.

The foregoing descriptions are only example embodiments of the disclosure, but are not intended to limit the scope of the disclosure. Any modification, equivalent replacement, or improvement made within the spirit and principle of the disclosure shall fall within the protection scope of the disclosure.

What is claimed is:

1. A method for displaying an equipment in a virtual environment battle, performed by a terminal, the method comprising:
    displaying a first battle interface of the virtual environment battle, the virtual environment battle being a battle mode in which a virtual character competes with other characters in a virtual environment;
    displaying a main equipment slot, an auxiliary equipment slot, and an expansion control interface in a first partial region of the first battle interface, the main equipment slot for displaying a main equipment of the virtual character, and the auxiliary equipment slot for displaying a first auxiliary equipment of the virtual character;
    receiving a first trigger signal on the expansion control interface; and
    displaying a second battle interface of the virtual environment battle and displaying the main equipment slot, the auxiliary equipment slot, and an expansion equipment slot in a second partial region of the second battle interface, and the expansion equipment slot for displaying a second auxiliary equipment owned by the virtual character other than the first auxiliary equipment,
    wherein a display priority of the first auxiliary equipment is greater than a display priority of the second auxiliary equipment.

2. The method according to claim 1, further comprising:
    receiving a second trigger signal on the expansion equipment slot; and
    switching the second auxiliary equipment in the expansion equipment slot with the main equipment in the main equipment slot.

3. The method according to claim 1, wherein the second battle interface further displays a contraction control interface, and the method further comprises:
    receiving a third trigger signal on the contraction control interface; and
    displaying a third battle interface of the virtual environment battle, the main equipment slot, the auxiliary equipment slot, and the contraction control interface being displayed in a third partial region of the third battle interface.

4. The method according to claim 1, wherein before the displaying the first battle interface of the virtual environment battle, the method further comprises:
    determining display priorities of at least two auxiliary equipment owned by the virtual character;
    based on a display priority of an auxiliary equipment being higher than a first condition, determining the auxiliary equipment as the first auxiliary equipment among the at least two auxiliary equipment; and
    based on the display priority of the auxiliary equipment being lower than a second condition, determining the auxiliary equipment as the second auxiliary equipment among the at least two auxiliary equipment.

5. The method according to claim 1, further comprising:
    detecting whether a number of equipment owned by the virtual character is greater than or equal to a preset threshold; and
    displaying the first battle interface of the virtual environment battle based on the number of equipment owned by the virtual character being greater than or equal to the preset threshold.

6. The method according to claim 1, wherein a theme color of the main equipment slot is different from a theme color of the auxiliary equipment slot, and
    wherein the theme color of the auxiliary equipment slot is the same as a theme color of the expansion equipment slot.

7. The method according to claim 1, wherein a display area of the main equipment slot is greater than a display area of the auxiliary equipment slot, and the display area of the auxiliary equipment slot is the same as a display area of the expansion equipment slot.

8. An apparatus for displaying an equipment in a virtual environment battle, the apparatus comprising:
    at least one memory configured to store computer program code; and
    at least one processor configured to access the memory and operate as instructed by the computer program code, the computer program code comprising:
    a displaying code configured to cause the at least one processor to display a first battle interface of the virtual environment battle, the virtual environment battle being a battle mode in which a virtual character competes with other characters in a virtual environment, and display a main equipment slot, an auxiliary equipment slot, and an expansion control interface in a first partial region of the first battle interface, the main equipment slot for displaying a main equipment of the virtual character, and the auxiliary equipment slot for displaying a first auxiliary equipment of the virtual character;
    an interaction code configured to cause the at least one processor to receive a first trigger signal on the expansion control interface; and
    the displaying code configured to cause the at least one processor to display a second battle interface of the virtual environment battle, and display the main equipment slot, the auxiliary equipment slot, and an expansion equipment slot a second partial region of the second battle interface, and the expansion equipment slot for displaying a second auxiliary equipment owned by the virtual character other than the first auxiliary equipment, wherein a display priority of the first auxiliary equipment is greater than a display priority of the second auxiliary equipment.

9. The apparatus according to claim 8, wherein the interaction code is further configured to cause the at least one processor to receive a second trigger signal on the expansion equipment slot; and the displaying code is further configured to cause the at least one processor to switch the second auxiliary equipment in the expansion equipment slot with the main equipment in the main equipment slot.

10. The apparatus according to claim 8, wherein the display code is further configured to cause the at least one processor to display a contraction control interface in the second battle interface, wherein the interaction code is further configured to cause the at least one processor to receive a third trigger signal on the contraction control interface, and wherein the displaying code is further configured to cause the at least one processor to display a third battle interface of the virtual environment battle, the main equipment slot, the auxiliary equipment slot, and the contraction control interface being displayed in a third partial region of the third battle interface.

11. The apparatus according to claim 8, wherein the displaying code is further configured to cause the at least one processor to:

determine display priorities of at least two auxiliary equipment owned by the virtual character;

based on a display priority of an auxiliary equipment being higher than a first condition, determine the auxiliary equipment as the first auxiliary equipment among the at least two auxiliary equipment; and based on the display priority of the auxiliary equipment being lower than a second condition, determine the auxiliary equipment as the second auxiliary equipment among the at least two auxiliary equipment.

12. The apparatus according to claim 8, further comprising a detecting code configured to cause the at least one processor to detect whether a number of equipment owned by the virtual character is greater than or equal to a preset threshold; and wherein the displaying code is further configured to cause the at least one processor to display the first battle interface of the virtual environment battle based on the number of equipment owned by the virtual character being greater than or equal to the preset threshold.

13. The apparatus according to claim 8, wherein a theme color of the main equipment slot is different from a theme color of the auxiliary equipment slot, and wherein the theme color of the auxiliary equipment slot is the same as a theme color of the expansion equipment slot.

14. The apparatus according to claim 8, wherein a display area of the main equipment slot is greater than a display area of the auxiliary equipment slot, and the display area of the auxiliary equipment slot is the same as a display area of the expansion equipment slot.

15. A terminal, comprising a memory and a processor, the memory storing at least one instruction, the at least one instruction being loaded and executed by the processor to implement the method for displaying the equipment in the virtual environment battle according to claim 1.

16. A non-transitory computer readable storage medium, storing at least one instruction, when the at least one instruction is loaded and executed by a processor, causes the processor to:

display a first battle interface of the virtual environment battle, the virtual environment battle being a battle mode in which a virtual character competes with other characters in a virtual environment, and display a main equipment slot, an auxiliary equipment slot, and an expansion control interface in a first partial region of the first battle interface, the main equipment slot for displaying a main equipment of the virtual character, and the auxiliary equipment slot for displaying a first auxiliary equipment of the virtual character;

receive a first trigger signal on the expansion control interface; and display a second battle interface of the virtual environment battle, and display the main equipment slot, the auxiliary equipment slot, and an expansion equipment slot a second partial region of the second battle interface, and the expansion equipment slot for displaying a second auxiliary equipment owned by the virtual character other than the first auxiliary equipment, wherein a display priority of the first auxiliary equipment is greater than a display priority of the second auxiliary equipment.

17. The non-transitory computer readable storage medium according to claim 16, wherein the at least one instruction is loaded and executed by the processor to:

receive a second trigger signal on the expansion equipment slot; and switch the second auxiliary equipment in the expansion equipment slot with the main equipment in the main equipment slot.

18. The non-transitory computer readable storage medium according to claim 16, wherein the at least one instruction is loaded and executed by the processor to:

display a contraction control interface in the second battle interface;

receive a third trigger signal on the contraction control interface; and display a third battle interface of the virtual environment battle, the main equipment slot, the auxiliary equipment slot, and the contraction control being displayed in a third partial region of the third battle interface.

* * * * *